United States Patent Office 2,916,098
Patented Dec. 8, 1959

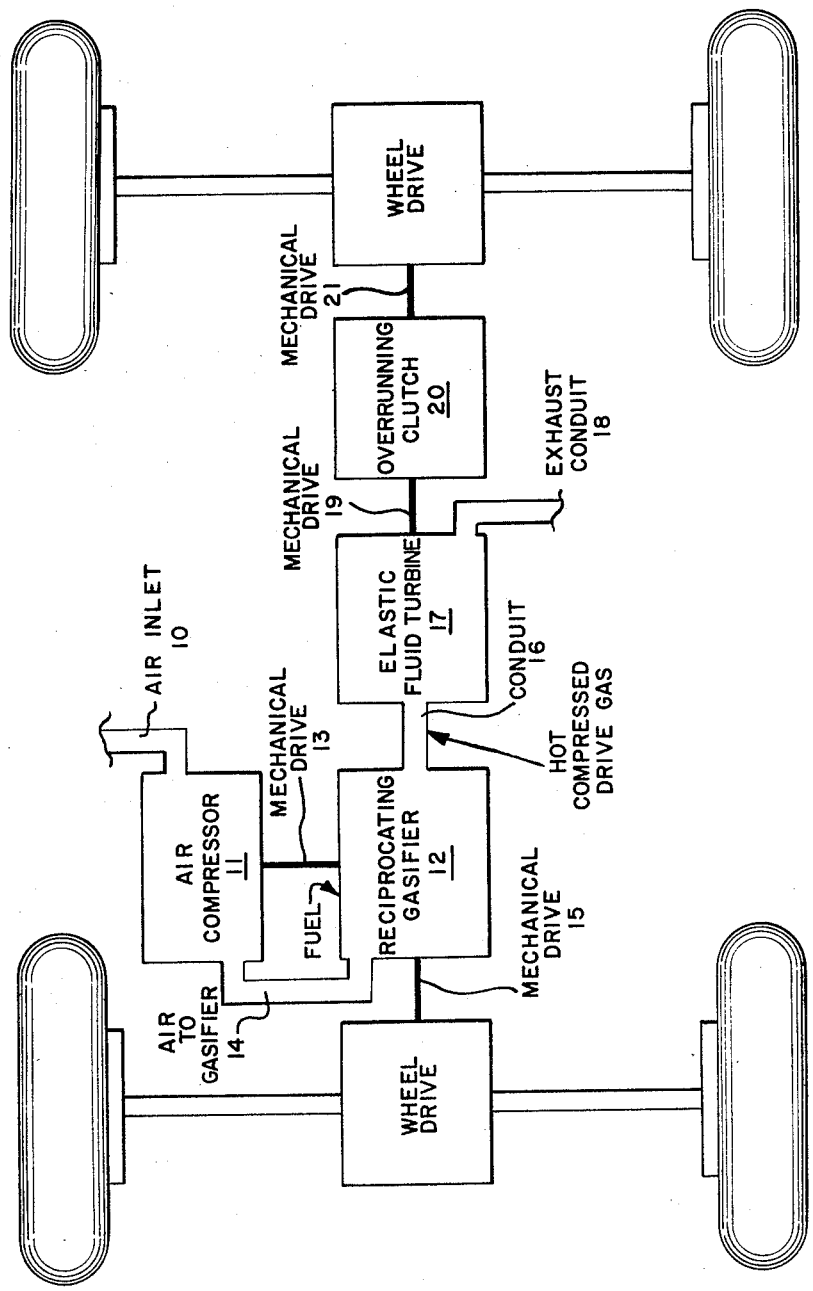

2,916,098

MOTOR VEHICLE

Gordan H. Millar, Inkster, Mich., assignor to Ford Motor Company, Dearborn, Mich., a corporation of Delaware Application February 25, 1957, Serial No. 641,893

5 Claims. (Cl. 180—66)

This invention relates to a motor vehicle construction and more particularly to a motor vehicle driven by the combined action of an internal combustion engine acting as a reciprocating gasifier and by an elastic fluid turbine.

Much effort has been expended in an effort to evolve a practical gas turbine driven automotive vehicle. The same statement may be made concerning the combination of a gas turbine and the so-called free piston engine, the gaseous effluent from the free piston engine being employed to drive the gas turbine. To date, none of these efforts have achieved notable commercial success.

The instant invention has been evolved in an effort to combine the most desirable qualities of the gas turbine, the free piston engine gasifier and the conventional reciprocating engine.

This invention may well be understood by reference to the figure of drawing which is a schematic illustration of the invention.

The air for the operation of the automotive power plant is passed through air inlet 10 and into air compressor 11. Air compressor 11 is driven by reciprocating gasifier 12 through mechanical drive 13. The output of air compressor 11 is led through conduit 14 and supports combustion in reciprocating gasifier 12. Reciprocating gasifier 12 may be any conventional reciprocating internal combustion engine equipped with a mechanical drive 13 for propelling air compressor 11 and a further mechanical drive 15 which is connected by conventional means to one of the two pairs of wheels supporting the vehicle. Usually, although not necessarily, this will be the front wheels of the vehicle. The hot compressed exhaust gas leaving the reciprocating gasifier 12 flows through conduit 16 into elastic fluid turbine 17 and is then exhausted through exhaust conduit 18.

The combustion conditions in reciprocating gasifier 12 are chosen so that combustion is substantially complete in the gasifier. The products of combustion of gasifier 12 depart from this machine at sufficiently high temperature and pressure to act as a working fluid for elastic fluid turbine 17.

The mechanical effort of elastic fluid turbine 17 is transmitted through mechanical drive 19 to overrunning clutch 20 and through mechanical drive 21 to the other pair of wheels. Again, the pair of wheels driven by the elastic fluid turbine 17 will usually, but not necessarily, be the rear wheels.

It is to be emphasized that this has no mechanical connection between the elastic fluid turbine 17 and the reciprocating gasifier 12 other than that provided through the road upon which the vehicle is travelling.

I claim as my invention:

1. A motor vehicle comprising a first pair of wheels located on opposite sides of the longitudinal axis of the vehicle and a second pair of wheels also located on opposite sides of the longitudinal axis of the vehicle, said first pair of wheels being driven by an elastic fluid turbine, said second pair of wheels being drivingly connected by a mechanical drive to a reciprocating gasifier, said elastic fluid turbine and reciprocating gasifier being drivingly connected only by a conduit capable of conveying the product of the reciprocating gasifier to the elastic fluid turbine.

2. A motor vehicle comprising a first pair of wheels located on opposite sides of the longitudinal axis of the vehicle and a second pair of wheels also located on opposite sides of the longitudinal axis of the vehicle, said first pair of wheels being driven by an elastic fluid turbine, said second pair of wheels being drivingly connected by a mechanical drive to a reciprocating gasifier, said elastic fluid turbine and reciprocating gasifier being drivingly connected only by a conduit capable of conveying the product of the reciprocating gasifier to the elastic fluid member and said reciprocating gasifier being drivingly connected to an air compressor which compressor is connected to the air inlet of the reciprocating gasifier.

3. A motor vehicle comprising a first pair of wheels located on opposite sides of the longitudinal axis of the vehicle and a second pair of wheels also located on opposite sides of the longitudinal axis of the vehicle, said first pair of wheels being driven by an elastic fluid turbine through an overrunning clutch, said second pair of wheels being drivingly connected by a mechanical drive to a reciprocating gasifier, said elastic fluid turbine being drivingly connected to the reciprocating gasifier only by a conduit, and said reciprocating gasifier being drivingly connected to an air compressor which compressor is connected to the air inlet of the reciprocating gasifier.

4. In a motor vehicle having a longitudinal frame and front and rear pairs of road wheels mounted on opposite sides of said frame that improvement comprising a reciprocating gasifier, said front wheels in mechanical driven relationship to said gasifier, an elastic fluid turbine in driving relationship to said rear wheels, an air compressor driven by said gasifier and connected to supply air thereto for combustion, and said turbine and gasifier connected only by a conduit capable of conveying the product of the gasifier to the turbine.

5. In a motor vehicle having a longitudinal frame and front and rear pairs of wheels mounted on opposite sides of said frame that improvement comprising a reciprocating gasifier, said front wheels in mechanical driven relationship to said gasifier, an elastic fluid turbine, an overrunning clutch, said turbine in driving relationship to said rear wheels through said clutch, an air compressor driven by said gasifier and connected to supply air thereto for combustion, and said turbine and gasifier connected only by a conduit capable of conveying the product of the gasifier to the turbine.

References Cited in the file of this patent

UNITED STATES PATENTS

| | | |
|---|---|---|
| 2,244,742 | Tyson | June 10, 1941 |
| 2,468,828 | Kopp | May 3, 1949 |
| 2,585,029 | Nettel | Feb. 12, 1952 |
| 2,626,001 | Antle | Jan. 20, 1953 |
| 2,647,416 | Turner et al. | Aug. 4, 1953 |
| 2,695,497 | Huber | Nov. 30, 1954 |